United States Patent
Lukasiewicz et al.

[11] Patent Number: 5,485,345
[45] Date of Patent: Jan. 16, 1996

[54] PRESSURE TRANSDUCER APPARATUS

[75] Inventors: Stanley J. Lukasiewicz, North Attleboro; Robert P. Bishop, Pembroke, both of Mass.; Robert O. Southworth, Pawtucket, R.I.; Keith W. Kawate, Attleboro Falls, Mass.

[73] Assignee: Texas Instruments Incorporated, Dallas, Tex.

[21] Appl. No.: 339,039

[22] Filed: Nov. 14, 1994

[51] Int. Cl.$^6$ .............................. H01G 7/00; G01L 9/12
[52] U.S. Cl. ...................... 361/283.3; 361/283.4; 73/718; 73/724
[58] Field of Search .............................. 361/283.1, 283.2, 361/283.3, 283.4; 73/718, 724

[56] References Cited

U.S. PATENT DOCUMENTS

| | | |
|---|---|---|
| 4,357,834 | 11/1982 | Kimura . |
| 4,425,799 | 1/1984 | Park . |
| 4,523,474 | 6/1985 | Browne et al. ........................ 73/724 |
| 4,680,971 | 6/1987 | Kavli et al. . |
| 4,716,492 | 12/1987 | Charboneau et al. . |
| 5,044,202 | 9/1991 | Southworth et al. . |
| 5,189,916 | 3/1993 | Mizumoto et al. . |
| 5,214,961 | 6/1993 | Kojima et al. . |
| 5,275,054 | 1/1994 | Park . |
| 5,349,865 | 9/1994 | Kavli et al. . |

*Primary Examiner*—Bot L. Ledynh
*Attorney, Agent, or Firm*—Russell E. Baumann; René E. Grossman; Richard L. Donaldson

[57] ABSTRACT

A monolithic capacitive differential pressure transducer (10, 44,) is shown composed of ceramic material having first and second cavities formed adjacent to opposed face surfaces to form first and second flexible diaphragms (12, 14; 50, 52) and a motion transfer pin (24, 58) attached to and extending between the diaphragms. Capacitor plates are disposed on a surface of at least one flexible diaphragm and a stationary member to form a capacitive gap. Component parts are first pressed from ceramic powder and assembled into a unit using one of several methods including relatively high pressure to press them together or using a combination of low pressure along with raising the temperature of the material to soften the binder in the ceramic material at surfaces of the parts which are to be joined together. Selected gaps, both along the x-y direction and along the z direction may be obtained, particularly in assembling the parts using high pressure using consumable spacer material which is sublimated in a debinderization cycle prior to sintering of the unit to form a monolithic body.

3 Claims, 2 Drawing Sheets

PRESSURE TRANSDUCER APPARATUS

BACKGROUND OF THE INVENTION

This invention relates generally to pressure sensors and more particularly to pressure responsive variable parallel plate capacitive transducers. Such transducers are shown and described, for example, in U.S. Pat. No. 4,716,492, assigned to the assignee of the present invention. A capacitive transducer is shown in the patent having a thin ceramic diaphragm mounted in closely spaced, sealed, overlying relation on a ceramic base, with metal coatings deposited on respective opposing surfaces of the diaphragm and the base to serve as capacitor plates arranged in predetermined closely spaced relation to each other to form a capacitor. Transducer terminals connected to the capacitor plates are arranged at an opposite surface of the transducer base and a signal conditioning electrical circuit connected to the transducer terminals is mounted on the transducer. A cup-shaped connector body of electrical insulating material is fitted over the electrical circuit and is secured to the transducer by a housing sleeve which has a port for exposing the transducer diaphragm to an applied fluid pressure. The diaphragm is movable in response to variations in pressure applied to the diaphragm to vary the capacitance of the capacitor and the electrical circuit provides an electrical output signal corresponding to the applied pressure.

In copending, coassigned patent application Ser. No. 07/972,680 filed Nov. 6, 1992, a capacitive pressure transducer is shown and described in which metal capacitor plates are disposed on opposite sides of two surfaces defining a cavity or gap formed closely adjacent an outer surface of a monolithic ceramic body. The ceramic comprises conventional material, such as alumina, provided in powdered form coated with an organic binder pressed into first and second portions, i.e., a diaphragm and a base having a recess formed in an outer face surface, by pressing the powder in a die. Metallized coatings are deposited as by screen printing a thick film paste on one surface of the diaphragm portion and on the recessed outer face surface of the base portion. The vehicle used in the thick film paste is then removed as by heating. A spacer of organic material may be placed in the recess to ensure that the cavity gap is maintained during a following pressing step in which the two portions are pressed together to form a single unit. The unit is then heated to a first debinderizing temperature. After the organics, including the spacer means, are vaporized/decomposed and released through still open cells of the ceramic, the unit is placed in a high temperature oven and co-fired in a reducing atmosphere with the metal layers forming a conductive coating bonded to the ceramic and the ceramic being sintered together to form a monolithic, closed cell body. In a modified embodiment, low temperature ceramic materials are used for the ceramic which can be sintered at a temperature low enough to permit use of conventional printed circuit inks fired in an air atmosphere.

The use of consumable spacer material, as noted in the above referenced application, is effective in forming closely controlled gaps limited essentially along an x-y plane in a monolithic ceramic body; however, there is a need to provide structures having controlled gaps along the z direction as well. For example, in making a monolithic differential pressure sensor in which two flexible diaphragms are placed over recesses formed on opposite sides of a base with a force transfer pin extending between the diaphragms and disposed in an opening in the base along the z axis, a gap must be maintained between the transfer pin and the sidewall forming the opening to permit unfettered motion of the pin under an applied force. However, the step of pressing the green ceramic components together in assembling the unit tends to close this gap thereby interfering with such movement.

SUMMARY OF THE INVENTION

It is an object of the invention to provide a method for making a monolithic ceramic body having controlled gaps along the z direction as well as along x-y directions. Another object of the invention is to provide monolithic differential pressure transducers and methods for making such transducers.

Briefly, in accordance with the invention, components are formed by subjecting powdered ceramic material coated with a binder to sufficient pressure to maintain a selected configuration and then assembling the components and heating them to a sintering temperature to create a monolithic body. According to one embodiment, at the time of assembly, controlled gaps along the z direction are provided by applying a consumable spacer material to one or both of the surfaces of a member intended for movement in the final device, such as a motion transfer pin, and a bore through which the member is to move. Components of the transducer are then pressed together so that they adhere to one another and are then subjected to a first debinderizing temperature at which the organics, including the consumable spacer material, are vaporized/decomposed and released through open cells of the ceramic material and then to a second higher temperature to sinter the ceramic material to form a monolithic, closed cell body. According to another embodiment, once the green ceramic components are individually formed they are assembled and adhered to one another by raising the temperature of the mating surfaces sufficiently to soften the binder material and using only a low level of force so that there is no flow or deformation of the ceramic material. This procedure results in maintaining gaps along the z direction since there is essentially no flow or deformation of the ceramic material. According to a modified embodiment, error due to common mode pressure applied to both diaphragms is eliminated by compensating for movement of one diaphragm through offsetting movement of the motion transfer pin, e.g., by providing diaphragms of different areas having a selected ratio. In another modified embodiment, certain ones or parts of the green ceramic components are formed having greater density than other parts of the components of a device in order to place a selected tensile force on portions of the device due to differential shrinkage. One device made in accordance with this modified embodiment has first and second ring portions circumscribing respective first and second diaphragms formed adjacent recesses in a body with the ring portions being pressed to a greater density than the remainder of the components forming the device. Due to the greater density, the ring portions shrink less than the other components thereby tending to stretch the diaphragms by placing a tensile force on them.

BRIEF DESCRIPTION OF THE DRAWINGS

Other objects, advantages and details of the novel and improved transducers of the invention and method of making appear in the following detailed description of preferred embodiments of the invention, the detailed description referring to the drawings in which.

Figure 1:
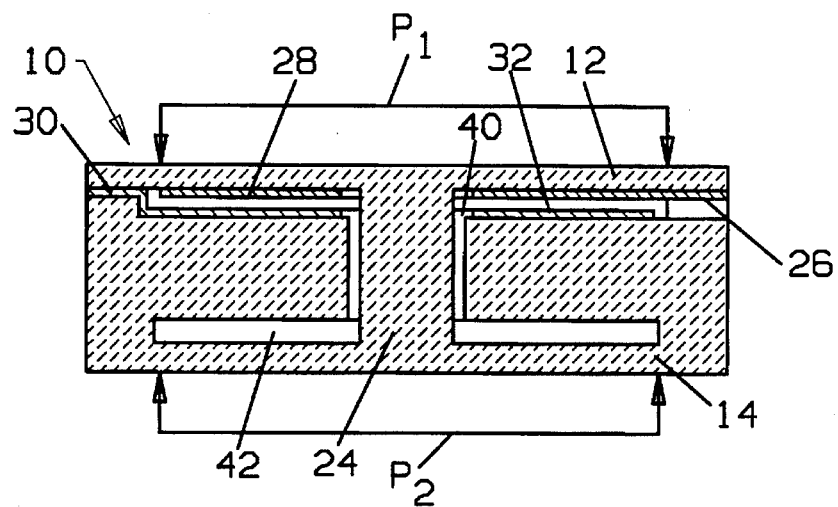
FIG. 1 is a cross sectional view of a monolithic differential pressure capacitive transducer made in accordance with a first embodiment of the invention.
Figure 2:
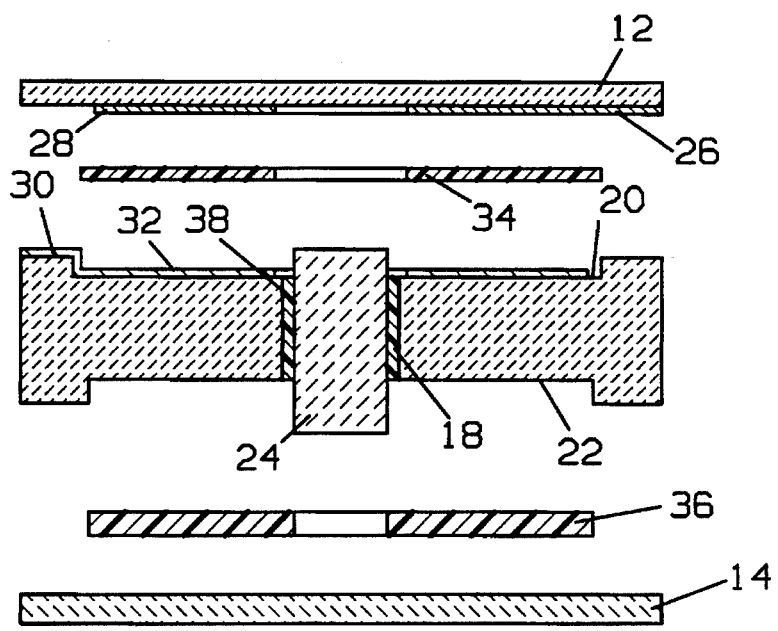
FIG. 2 is a cross sectional, exploded view of green ceramic component parts and consumable spacers used in making the FIG. 1 transducer.

With particular reference to FIGS. 1 and 2 of the drawings, a differential pressure responsive, variable capacitive transducer 10 made in accordance with the invention comprises a monolithic body of ceramic material having first and second cavities formed therein closely adjacent respective opposed first and second outer surfaces of the body with a bore extending between the cavities. A motion transfer pin is slidably disposed within the bore and has opposite ends attached to the respective diaphragms. Capacitor plates formed of suitable material, such as metal, are disposed on opposed surfaces of each of the cavities with vias extending from the plates to respective terminal pads for connection to externally disposed signal conditioning electrical circuitry (not shown).

Although various ceramic materials can be utilized such as cordierite, mullite, etc., according to a first embodiment of the invention, a suitable composition comprises between approximately 80% by weight up to essentially 100% alumina with the balance being additives which form a glass at the sintering temperature of the alumina. Such material is conventional in the electronic substrate industry and can be either purchased as a spray dried powder ready to press or can be specifically formulated and spray dried according to known techniques to produce a free-flowing, granulated powder ready for pressing. The spray dried powder contains the alumina and an organic binder such as polyvinyl alcohol or other plastic to serve as a temporary adhesive holding the powder together after pressing until the resultant pressed material is sintered.

Using a pressure in the range of approximately 1,000–30,000 psi, the alumina spray dried powder is pressed into the shapes of first and second generally cylindrical diaphragms 12, 14, and a generally cylindrical base 16 having a centrally disposed bore 18 formed therethrough with first and second recesses 20, 22 formed in opposed face surfaces of the base. The alumina powder is also pressed into a motion transfer pin 24 shown having a generally cylindrical configuration; however, it will be understood that it could be of various cross sectional shapes such as rectangular or elliptical. The recesses 20, 22 have a suitable selected depth of generally between 0.001 to 0.010 inches. Although it is convenient to form the recesses in base 16, it will be realized that they could be formed wholly or partially in diaphragm 12, 14 as well. The depth of the recesses is selected to allow for shrinkage of the materials upon sintering to provide spacing between capacitor plates applied to the bottom of the recesses and the inner surface of the diaphragm from approximately 0.5 to 2.5 mils in the finished transducer. Although it is preferred to form the noted recesses in the parts prior to assembling the parts together, it is within the purview of the invention to place consumable spacing material between the parts where it is intended to form the recess so that upon pressing the parts together during assembly the recess will be formed by the spacing material forcing the green ceramic material to deform to the configuration of the spacing material.

After the initial pressing, the green ceramic components are strong enough to permit handling. Selected electrode patterns 26, 30 are applied respectively to the inner surface of at least one of the diaphragms 12, 14 and the respective outer surfaces of base 16 by any suitable means, such as screen printing. Any suitable high temperature metal can be used such as tungsten, molybdenum, platinum or other high temperature materials such as conductive ceramic. For screen printing the metallization is applied in the form of conventional thick film paste which typically contains certain solvents to adjust viscosity for screen printing. After application, the solvents can be removed slowly at room temperature or more rapidly by placing the parts into an oven at approximately 100° C.

Although it is possible to press the diaphragms and base together without any spacing means placed therebetween and still maintain gaps along the x-y direction between the diaphragms and the bottom of the recessed areas, particularly with relatively large gaps, it is preferred to use a fugitive spacer, particularly with relatively smaller gaps. A spacer helps to maintain the separation between electrodes 28, 32 and prevent the electrodes from engaging one another when the diaphragms are pressed to the base. Annular fugitive spacer elements 34, 36 composed of essentially non-compressible, consumable or decomposable material each having a thickness preferably essentially equal to the desired spacing between the electrodes or a plurality of sheets of such material the total thickness of which preferably essentially equals the desired spacing are placed in respective recesses 20, 22. The spacer material is selected so that it is clean burning, i.e., so that there is no ash remaining after the spaces have been thermally removed after pressing the base and the diaphragms together. Polypropylene carbonate and Delrin, a trademark of E.I. du Pont de Nemours Company for acetal, thermoplastic resin are two such materials, and can be used in various thicknesses depending upon the desired gap.

A gap along the z direction, between the surface of bore 18 and motion transfer pin 24 is provided by coating, as by brushing, spraying or dipping, the cylindrical surface of pin 24 and/or the surface of bore 18 with a solution of consumable material such as Q-Pac 40M, a trademark of Pac Polymers, Incorporated for polypropylene carbonate and a suitable solvent such as caprolactone or acetone. When the solvent evaporates a thin film 38 of the polypropylene carbonate remains. When the assembly of parts is pressed together pin 24 and the surface of bore 18 are separated by the consumable spacer material.

The component parts, including the consumable spacers, are then placed into a die or suitable isostatic press and pressed together using a pressure in a range between approximately 1,000 and 30,000 psi.

The diaphragms, pin and base, now pressed together to form a single body or unit is placed in an oven and heated in an air atmosphere at relatively low temperatures, e.g., 300° C. in order to evaporate and burn out the binders and spacer material and allow the evaporated matter and combustion gases to pass through the pores of the body before the body is sintered and the pores closed. The temperature is limited by the maximum temperature at which the metallization can be heated in an air or oxygen atmosphere without significant oxidation.

After removing as much as possible of the organic binder and the spacer material during the debinderizing operation, the assembled unit is placed into a high temperature furnace and sintered in the range of approximately 1400°–1700° C. in a reducing atmosphere. Typically, the atmosphere contains approximately 1–100% hydrogen or dissociated ammonia with the balance usually nitrogen.

With appropriate binders in the spray dried powder and with an appropriate polymer for the spacers it will be appreciated that the debinderization step could be accomplished as a part of the firing cycle.

The specific materials for the metallization and the ceramic are chosen so that the shrinkage rates are close enough to each other to prevent warpage. Further, the thermal contraction of the materials should be sufficiently similar and the temperature profile employed during cooling from the firing temperature such that cracking does not occur.

Sintering the alumina converts the unit into a monolithic device 10 as seen in FIG. 1 having first and second cavities 40, 42 with diaphragm portions 12, 14 connected together through motion transfer pin portion 24 with an atmosphere determined by the sintering atmosphere of the furnace. For vacuum devices the furnace could be evacuated prior to reaching the sintering temperature or a suitable passage could be pressed into the base when originally formed and, if desired, filled with consumable spacer material. The passage could also be maintained open by using a tooling pin inserted in the passage during assembly and thereafter removed. The device could be evacuated after sintering and the passage sealed with suitable sealant material. For gauge devices the passage can remain open for venting. The sintering step is also used to effect bonding of the metallization layer to the alumina and form a conductive layer.

After the unit has been fired electrical connection means are added as by attaching pins (not shown) to the metallized vias with conductive epoxy. Any suitable notches, bores or the like to provide access to the vias can be provided during the original pressing steps.

Device 10 can also be formed utilizing relatively low temperature materials such as alumina, silica or other conventional materials and a glass binder used in making electronic substrates which can be sintered at temperatures such as 700°–1000° C. in air with standard thick film inks for metallization, such as silver, palladium, gold, copper and the like. For example, Electro-Science Laboratories, Inc. ceramic powder D101 comprising approximately 60% weight percent ceramic powder and 40 weight percent glass mixed with a suitable binder such as Duramax (a trademark of Rohm and Haas Company) B-1037 binder material can be used. The binder material in the form of a colloidal dispersion along with the ceramic powder is added to a mill and thoroughly mixed and then spray dried in a conventional manner. The B-1037 binder has a glass transition point of approximately 22° C. The spray dried powder can be pressed into desired configurations, suitable electrical traces of silver or other low temperature electrically conductive material screen printed onto the green pressed parts and the parts assembled together using sufficient heat to raise the temperature of the binder contiguous to the surfaces to be joined to a sufficient level to soften the binder, e.g., 70° C. and low force, in the order of 200–400 psi. Once the parts are adhered together the device can be sintered at 700°–1000° C. in an air atmosphere.

In using assembly techniques in which the force required to effect adherence of the parts without causing reflow of the green ceramic component parts, spacer material may be obviated when the designed gaps are sufficiently larger, i.e., gap of more than a few mils and having no closely controlled critical dimensions. For example, in device 10, bore 18 could be made significantly larger, on the order of 25–30 mils, to obviate the need for spacer material 38.

In use, diaphragm portion 12 is exposed to a first pressure $P_1$ and diaphragm portion 14 is exposed to a second pressure $P_2$. The diaphragm portions flex and motion transfer pin portion 24 moves in dependance upon the difference between pressures $P_1$ and $P_2$ which in turn changes the gap between the respective pairs of capacitor plates.

A differential pressure transducer 10 made in accordance with the invention is useful in many applications, particularly where there is no common pressure applied to the two diaphragms or where the common mode pressure is relatively small relative to the pressures being sensed. However, transducer 10 is subject to common mode characteristic since the diaphragm portions and movable capacitor plate can move, albeit slightly, independently of the motion transfer pin, thereby changing and introducing an error in the capacitance signal. For example, at pressures greater than zero if $P_1$ is the same as $P_2$, the gap between the sensing capacitor plate 26 and the source plate 30 changes due to the flexing of the diaphragms even though there is no net force on transfer pin 24.

Figure 3:
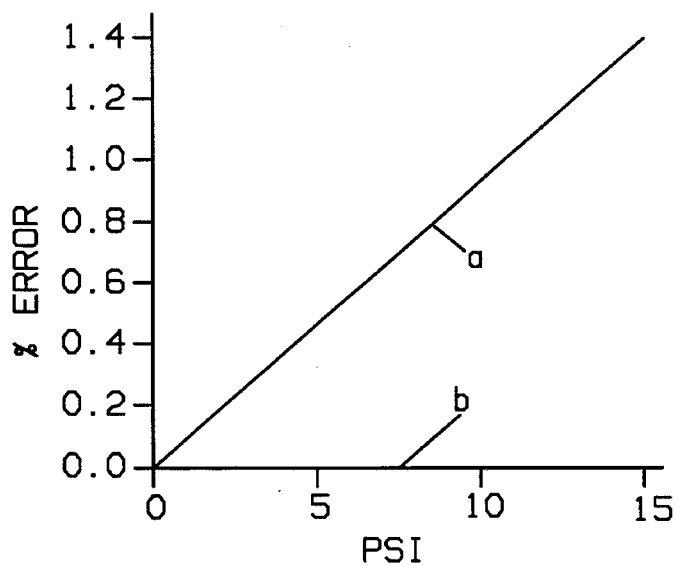
FIG. 3 is a graph of % error vs common mode pressure (psi) for uncompensated and compensated differential pressure sensors.

According to a feature of the invention, compensation for this error is provided by making the area of one of the diaphragms a selected amount greater than the area of the other diaphragm. For example, in the FIG. 1 transducer, if $P_1$ is equal to $P_2$ and greater than zero, diaphragm 12 will flex inwardly slightly; however, if diaphragms 12 and 14 are of the same area there will be no net force on transfer pin 14. By making the area of diaphragm 14 larger than the area of diaphragm 12 a net force will be placed on pin 24 causing it to move upwardly, as seen in FIG. 1, thereby moving diaphragm 12 and sense capacitor plate 28 away from source capacitor plate 32. The specific ratio of diaphragm diameters will depend on a number of factors including the thickness of the diaphragms, the diameter of the transfer pin, the capacitor gap and so on. However, by way of example, FIG. 3 shows the calculated percent error, plot a, for common mode pressure ranging from 0 to 15 psi for a differential pressure transducer of the type shown in FIG. 1 having diaphragms of the same area, i.e. 0.3750 inches. It will be seen that at 15 psi a 1.4% error results. However, with diaphragm 12 having a diameter of 0.3750 inches and diaphragm 14 a diameter of 0.3995 inches error over the common mode pressure range of 0–15 psi is eliminated as seen by plot b. The provision of error compensation becomes increasingly important the larger the common mode pressure relative to the differential pressure range to be measured.

Common mode pressure can also be compensated for by using a transfer pin having different diameters at its two opposite ends or by diaphragms having a selected thickness which varies relative to their radii.

Figure 4:
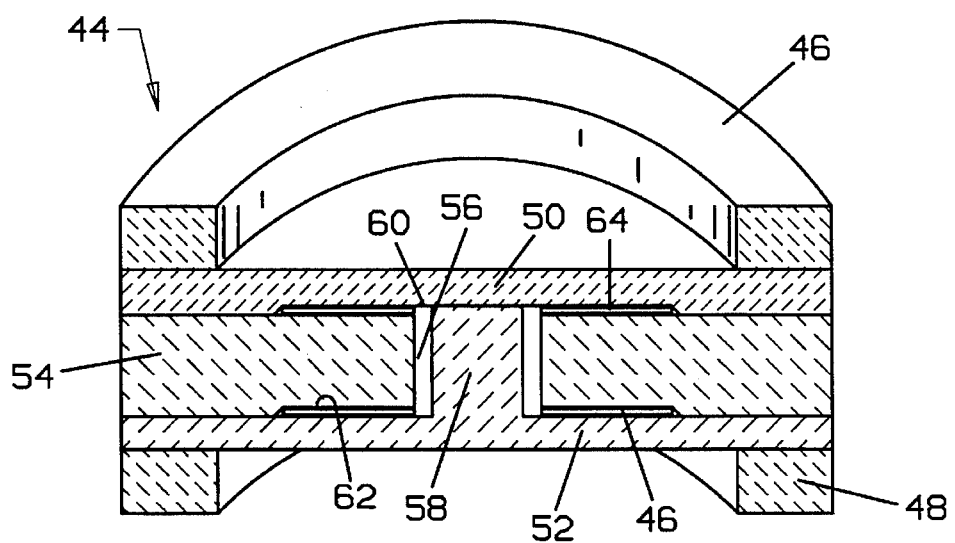
FIG. 4 is a cross section of a perspective view of another embodiment made in accordance with the invention.

With reference to FIG. 4, a modified differential pressure capacitive transducer 44 made using a low force method is shown prior to firing comprising pressed component parts including first and second annular hub portions 46, 48, first and second generally cylindrical diaphragm portions 50, 52 and generally cylindrical body portion 54. Body portion 54 is formed with a centrally disposed bore 56 which receives therethrough a pin portion 58 having a diameter at least 25–30 mils less than that of bore 56. Pin portion 58 may be formed integrally with diaphragm portion 52 during the pressing step so that it does not require handling as a separate, loose component. Suitable recesses 60, 62 are formed, recess 60 located in diaphragm portion 50 and recess 62 in body portion 54; however, the recesses could both be disposed in the body portion or in the respective diaphragm portions, if desired. Consumable spacer material in the form of annular sheets 64 are preferably placed in the respective recesses. Selected conductive inks (not shown)

having been applied to opposite faces of the component parts defining the recesses in a conventional manner, provide for the capacitor plates and suitable vias for making electrical connection thereto. An example of suitable spray dried ceramic powder is 96% alumina with 4% binder. The parts are stacked one on the other, adhered together by raising the temperature of the parts and applying pressure in the range of 300–500 psi, sufficient to effect adherence without reflow of the green ceramic and subjected to the debinderizing and sintering cycles described above in relation to FIGS. 1 and 2.

In order to ensure that intimate engagement is maintained between pin portion 58 and diaphragm 50, hub portions 46, 48 are pressed to a greater density than the remainder of the component parts so that during the sintering step they will shrink slightly less than the remainder of the component parts thereby stretching the diaphragm portions taut by placing a tensile force on them. For example, by pressing hub portions to a selected higher density to obtain a shrinkage rate of approximately 13% compared to a lower density for the diaphragm portions to obtain a shrinkage rate of approximately 15% results in a taut diaphragm structure. Care must be taken to limit the differential shrinkage to a degree which the structure can tolerate without cracking or breaking apart. Further, the force placed on the diaphragm portion should be generally symmetrical on opposite faces thereof. Therefore, body 54 disposed on the side of diaphragm portions 50, 52 removed from hub portions 46, 48 respectively and being relatively massive, is preferably pressed to a density higher than the diaphragm portions but lower than the hub portions. Shrinkage rates can also be controlled by varying the size of the particles, if desired, using compound presses and dies to achieve the two different density levels. Although hub portions 46, 48 are shown formed separately from respective diaphragm portions 52, 52, it will be appreciated that they could be green pressed into integral hub diaphragms if desired.

It should be understood that though preferred embodiments of the invention have been described by way of illustrating the invention, this invention includes all modifications and equivalent of the disclosed embodiments falling within the scope of the appended claims.

What is claimed:

1. A differential pressure transducer having a top surface and a bottom surface, a first recess formed adjacent to the top surface and a second recess formed adjacent to the bottom surface, the recesses each having a bottom wall, first and second diaphragm portions closing the respective first and second recesses, a passage extending between the first and second recesses, a motion transfer pin having opposite ends, one end integrally attached to a central part of the first diaphragm portion and the other end integrally attached to a central part of the second diaphragm portion, first and second capacitor plates disposed in at least one recess on a respective diaphragm portion and bottom wall spaced from one another to form a selected gap therebetween, means to electrically energize the capacitor plates and means to compensate for error due to common mode pressure subjected to the first and second diaphragm portions.

2. A differential pressure transducer according to claim 1 in which the means to compensate for error due to common mode pressure comprises the first and second diaphragm portions having unequal areas.

3. A differential pressure transducer according to claim 1 in which the first capacitor plate is disposed on the first diaphragm portion and the means to compensate for error due to common mode pressure comprises the second diaphragm portion having a selected area larger than the first diaphragm portion.

\* \* \* \* \*